United States Patent
Park

(10) Patent No.: US 9,839,081 B2
(45) Date of Patent: Dec. 5, 2017

(54) BALLAST STABILIZER-COMPATIBLE LAMP HAVING LEAKAGE CURRENT PROTECTION CIRCUIT

(71) Applicant: LG INNOTEK CO., LTD., Seoul (KR)

(72) Inventor: Jong June Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/263,541

(22) Filed: Sep. 13, 2016

(65) Prior Publication Data

US 2017/0079100 A1   Mar. 16, 2017

(30) Foreign Application Priority Data

Sep. 14, 2015  (KR) .................. 10-2015-0129707

(51) Int. Cl.
| | |
|---|---|
| *F21V 25/00* | (2006.01) |
| *F21V 25/02* | (2006.01) |
| *H05B 33/08* | (2006.01) |
| *F21K 9/00* | (2016.01) |

(52) U.S. Cl.
CPC .......... *H05B 33/0815* (2013.01); *F21K 9/00* (2013.01); *F21V 25/00* (2013.01); *H05B 33/0806* (2013.01); *H05B 33/0884* (2013.01)

(58) Field of Classification Search
CPC ............ H05B 33/0815; H05B 33/0884; H05B 33/0821; H05B 37/02; F21V 25/00; F21V 25/02
USPC .... 315/200 R, 208, 217, 291, 307–308, 127, 315/172, 186, 193, 209 R, 225
See application file for complete search history.

(56) References Cited

U.S. PATENT DOCUMENTS

| | | | |
|---|---|---|---|
| 2014/0104824 A1* | 4/2014 | Hsia .................. | F21V 25/04 362/221 |
| 2015/0181661 A1* | 6/2015 | Hsia .................. | F21V 25/04 315/160 |

FOREIGN PATENT DOCUMENTS

KR            101534785 B1 *  7/2015

* cited by examiner

*Primary Examiner* — Jimmy Vu
*Assistant Examiner* — Henry Luong
(74) *Attorney, Agent, or Firm* — LRK Patent Law Firm

(57) ABSTRACT

A ballast stabilizer-compatible lamp including a leakage current protection circuit includes a first input stage configured to receive first external power, a second input stage configured to receive second external power, a first switch module electrically connected to the first input stage and configured to switch on/off depending on a predetermined condition, a second switch module electrically connected to the second input stage and configured to switch on/off depending on a predetermined condition, an overvoltage protection circuit electrically connected to the first switch module and the second switch module and configured to prevent an overvoltage, a control module electrically connected to the overvoltage protection circuit and configured to sense and control the state of the first switch module, the first switch module, and the overvoltage protection circuit, and a light source electrically connected to the control module and configured to radiate light when power is applied.

13 Claims, 6 Drawing Sheets

BALLAST STABILIZER-COMPATIBLE LAMP HAVING LEAKAGE CURRENT PROTECTION CIRCUIT

CROSS REFERENCE TO RELATED APPLICATION

The present application claims the benefit of Korean Patent Application No. 10-2015-0129707, filed in the Korean Intellectual Property Office on Sep. 14, 2015, the entire contents of which are incorporated herein by reference.

BACKGROUND OF THE INVENTION

1. Technical Field

The present invention relates to a ballast stabilizer-compatible lamp including a leakage current protection circuit, including a first input stage configured to receive first external power, a second input stage configured to receive second external power, a first switch module electrically connected to the first input stage and configured to switch on/off depending on a predetermined condition, a second switch module electrically connected to the second input stage and configured to switch on/off depending on a predetermined condition, an overvoltage protection circuit electrically connected to the first switch module and the second switch module and configured to prevent an overvoltage, a control module electrically connected to the overvoltage protection circuit and configured to sense and control the state of the first switch module, the first switch module, and the overvoltage protection circuit, and a light source electrically connected to the control module and configured to radiate light when power is applied.

2. Description of the Related Art

Referring to FIG. 1, a ballast stabilizer is used in a fluorescent lamp or a Light-Emitting Diode (LED). The ballast stabilizer functions to form electricity of a high voltage and to prevent a flow of an excessive current. For this reason, commercial power (e.g., power of 110 V or 220 V) is not directly connected to the lamp, but is connected to the lamp via the ballast stabilizer.

In the case of a the ballast stabilizer-compatible lamp using such a ballast stabilizer, a common mechanical type switch, such as a contact type push method, is used to prevent an electric shock attributable to the leakage current when a user replaces or repairs the lamp.

In the case of a lamp using a ballast stabilizer, however, a driving voltage of about 1 k V or higher is first applied for 0.2 second. If a product using the mechanical type switch is used for a long time, high voltage power continues to be applied to a metal plate within the mechanical type switch itself. Accordingly, the mechanical type switch that needs to be an open state becomes physically a short-circuit state instantly. Accordingly, there is a problem there is a danger of a momentary electric shock for a user.

Furthermore, the mechanical type switch has a problem in that a defect may occur because moisture may be penetrated between switches because waterproofing, that is, the most important issue of an LED lamp, cannot be applied to the mechanical type switch. Accordingly, research has been carried out on various methods for implementing a ballast stabilizer-compatible lamp, which block an instant overvoltage and prevent the leakage current.

SUMMARY OF THE INVENTION

Accordingly, an object of the present invention is to provide a ballast stabilizer-compatible lamp including an electronic switch in order to prevent a momentary electric shock as described above.

Technical objects to be achieved by the present invention are not limited to the object, and various technical objects may be included within a range evident to those skilled in the art from the following description.

A ballast stabilizer-compatible lamp including a leakage current protection circuit according to an embodiment of the present invention includes a first input stage configured to receive first external power, a second input stage configured to receive second external power, a first switch module electrically connected to the first input stage and configured to switch on/off depending on a predetermined condition, a second switch module electrically connected to the second input stage and configured to switch on/off depending on a predetermined condition, an overvoltage protection circuit electrically connected to the first switch module and the second switch module and configured to prevent an overvoltage, a control module electrically connected to the overvoltage protection circuit and configured to sense and control the state of the first switch module, the first switch module, and the overvoltage protection circuit, and a light source electrically connected to the control module and configured to radiate light when power is applied.

Furthermore, in the ballast stabilizer-compatible lamp including a leakage current protection circuit according to an embodiment of the present invention, commercial power is converted into the predetermined first external power and second external power in a ballast stabilizer and inputted to the first input stage or the second input stage.

Furthermore, the ballast stabilizer-compatible lamp including a leakage current protection circuit according to an embodiment of the present invention further includes a first rectification circuit configured to rectify the first external power received from the first input stage and apply the rectified power to the first switch module and a second rectification circuit configured to rectify the second external power received from the second input stage and apply the rectified power to the second switch module. In this case, the first rectification circuit or the second rectification circuit includes a bridge diode.

Furthermore, in the ballast stabilizer-compatible lamp including a leakage current protection circuit according to an embodiment of the present invention, the first switch module or the second switch module includes a reverse bias diode configured to block a current in an opposite direction if the switch module is an off state, a TVS diode configured to operate when a predetermined voltage or more is applied, a protection resistor configured to prevent damage to the TVS diode, a switch element configured to switch on/off depending on a predetermined condition, and a capacitor configured to perform noise filtering.

In this case, in the ballast stabilizer-compatible lamp including a leakage current protection circuit according to an embodiment of the present invention, the switch element includes a thyristor (SCR) or an FET. Furthermore, the switch element switches on/off depending on the size of a voltage applied to the switch element. Furthermore, the TVS diode operates when a voltage applied to the TVS diode is 54 V or higher.

Furthermore, in the ballast stabilizer-compatible lamp including a leakage current protection circuit according to an embodiment of the present invention, the output stage of the first switch module and the output stage of the second switch module are electrically connected.

In the ballast stabilizer-compatible lamp including a leakage current protection circuit according to an embodiment of the present invention, if the first external power is normally received and the second external power is an off state, the first switch module is an on state and the second switch module is an off state.

Furthermore, in the ballast stabilizer-compatible lamp including a leakage current protection circuit according to an embodiment of the present invention, if the first external power is an off state and the second external power is normally received, the first switch module is an off state and the second switch module is an on state.

Furthermore, in the ballast stabilizer-compatible lamp including a leakage current protection circuit according to an embodiment of the present invention, the light source is an LED. Furthermore, the ballast stabilizer-compatible lamp includes a tube type lamp having a first input stage at one end and a second input stage at the other end.

Furthermore, in the ballast stabilizer-compatible lamp including a leakage current protection circuit according to an embodiment of the present invention, the first input stage further includes a first input electrode for receiving the first external power, and the second input stage further includes a second input electrode for receiving the second external power.

DETAILED DESCRIPTION

Hereinafter, a "ballast stabilizer-compatible lamp including a leakage current protection circuit" according to an embodiment of the present invention is described in detail with reference to the accompanying drawings. Embodiments to be described are provided in order for those skilled in the art to easily understand the technical spirit of the present invention, and the present invention is not restricted by the embodiments. Furthermore, contents represented in the accompanying drawings have been diagrammed in order to easily describe the embodiments of the present invention, and the contents may be different from drawing forms that are actually implemented.

Elements to be described herein are only examples for implementing the embodiments of the present invention. Accordingly, in other implementations of the present invention, different elements may be used without departing from the spirit and scope of the present invention.

Furthermore, an expression that some elements are "included" is an expression of an "open type", and the expression simply denotes that the corresponding elements are present, but should not be construed as excluding additional elements.

Furthermore, expressions, such as "the first" and "the second", are expressions used to only distinguish a plurality of elements from one another, and do not limit the sequence of the elements or other characteristics.

Furthermore, "power" according to an embodiment of the present invention may include all types of electric energy which may be used in a common electrical circuit, such as a "voltage", "electric power", and an "electric current."

Figure 1:
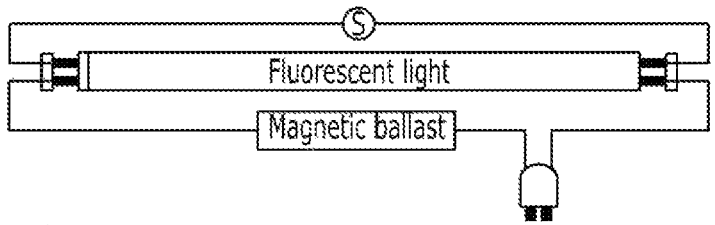
FIG. 1 is an exemplary diagram showing a conventional ballast stabilizer-compatible lamp.
Figure 1:
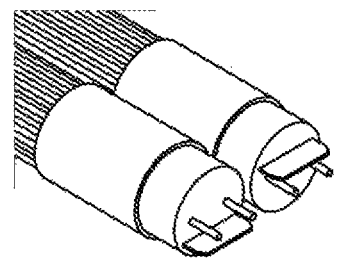
Figure 1:
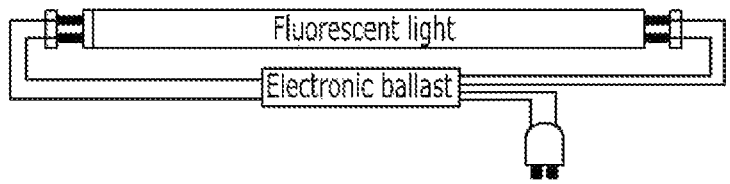
Figure 2:
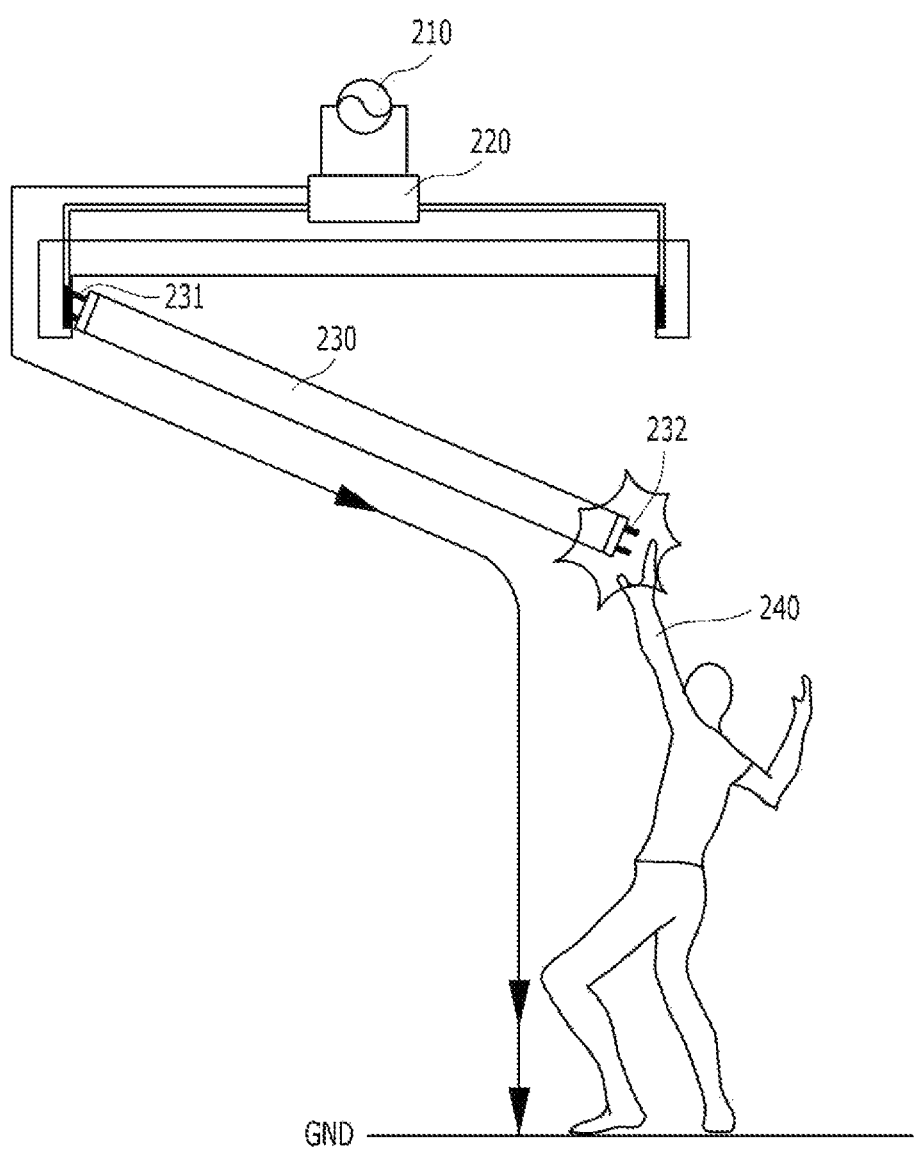
FIG. 2 is an exemplary diagram showing a conventional ballast stabilizer-compatible lamp.

FIGS. 1 and 2 are exemplary diagrams showing conventional ballast stabilizer-compatible lamps.

Referring to FIG. 1, a ballast stabilizer is used in a fluorescent lamp or a Light-Emitting Diode (LED). The ballast stabilizer functions to form electricity of a high voltage and to prevent a flow of an excessive current. For this reason, commercial power (e.g., power of 110 V or 220 V) is not directly connected to the lamp, but is connected to the lamp via the ballast stabilizer. The ballast stabilizer includes many types of ballast stabilizers, such as an electronic type and a magnetic type, and plays an important role to the extent that performance of the lamp is determined by performance and type of a ballast stabilizer.

If a user 240 replaces or repairs a tube type lamp 230 as shown in FIG. 2, he or she may directly come into contact with a second electrode 232. At this time, a ballast stabilizer 220 connected to commercial power 210 may conduct electricity through the first electrode 231 of the tube type lamp. The leakage current may flow to the user on the ground GND, and an overvoltage may be applied to the tube type lamp.

Accordingly, the tube type lamp has a danger of breakage and damage attributable to the application of an overvoltage, and the user has a danger of an electric shock. In order to avoid such problems, the tube type lamp further includes a switch for safety.

Figure 3:
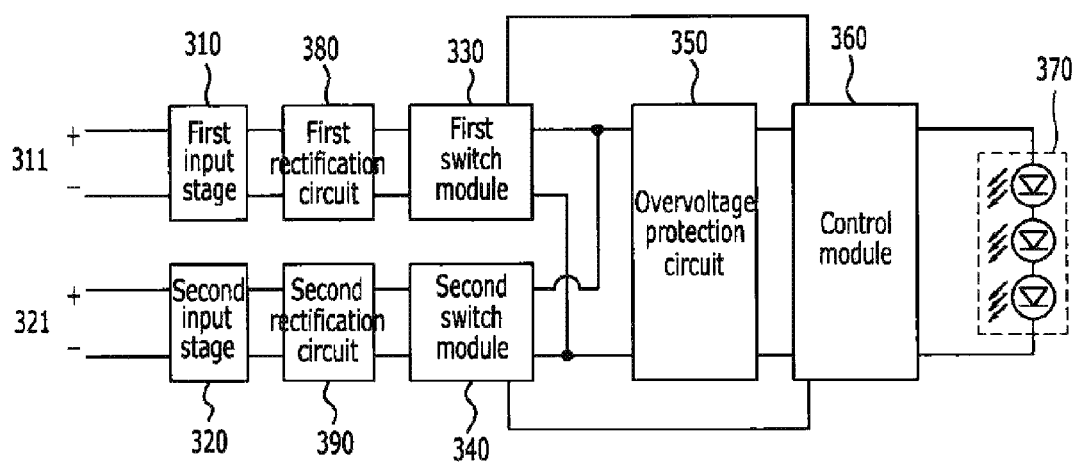
FIG. 3 shows the configuration of a ballast stabilizer-compatible lamp including a leakage current protection circuit according to an embodiment of the present invention.

FIG. 3 shows the configuration of a ballast stabilizer-compatible lamp including a leakage current protection circuit according to an embodiment of the present invention.

Referring to FIG. 3, the ballast stabilizer-compatible lamp including a leakage current protection circuit according to an embodiment of the present invention may include a first input stage 310, a second input stage 320, a first switch module 330, a second switch module 340, an overvoltage protection circuit 350, a control module 360, and a light source 370.

The first input stage 310 receives first external power 311, and the second input stage 320 receives second external power 321. In this case, commercial power is converted into the predetermined first external power and second external power in a ballast stabilizer, and the converted first external power and the converted second external power are inputted to the first input stage and the second input stage.

The ballast stabilizer is installed on a lamp connected thereto in order to supply a constant output value and consumption power. If the ballast stabilizer is installed, there are advantages in that electricity can be reduced and the lifespan of a lamp connected to the ballast stabilizer can be extended. Furthermore, if such a ballast stabilizer-compatible lamp is used, compatibility is easy although a lamp is replaced and the possibility of a failure can be reduced. A fluorescent replacement type LED lamp may also be used in a conventional fluorescent lamp ballast stabilizer. If such a ballast stabilizer-compatible lamp is used, an existing ballast stabilizer may be compatible with a lamp although several types of ballast stabilizers are used.

Accordingly, the first input stage or the second input stage according to an embodiment of the present invention is not directly connected to commercial power (e.g., 220 V or 110 V), but the commercial power is converted into the first external power or the second external power by a ballast stabilizer and the first external power or the second external power is inputted to the first input stage or the second input stage. Accordingly, the lifespan of a lamp can be extended and a failure can be reduced. In this case, the ballast stabilizer may be removed and the commercial power may be directly inputted to the first input stage or the second input stage depending on the place where a lamp is used.

The first switch module 330 is electrically connected to the first input stage 310 and switches on/off depending on a predetermined condition. Furthermore, the second switch module 340 is electrically connected to the second input stage 320 and switches on/off a predetermined condition.

Each of the first switch module and the second switch module turns on/off a switch element embedded therein in response to the state of power received from each of the first input stage and the second input stage, thereby being capable of preventing a danger of an electric shock and the application of an overvoltage.

Figure 4:
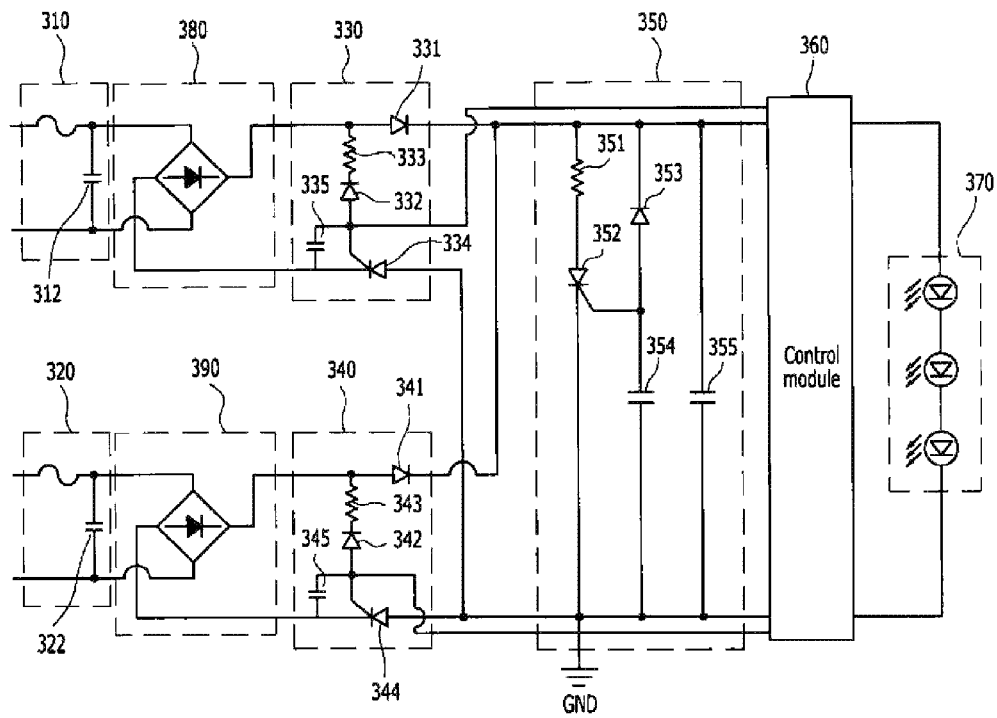
FIG. 4 is an exemplary diagram showing a ballast stabilizer-compatible lamp including a leakage current protection circuit according to an embodiment of the present invention.
Figure 5A:
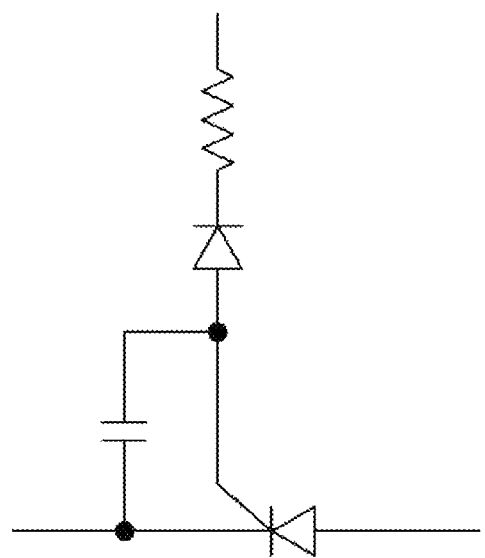
FIGS. 5A and 5B show the configurations of the switch module of the ballast stabilizer-compatible lamp including a leakage current protection circuit according to an embodiment of the present invention.
Figure 5B:
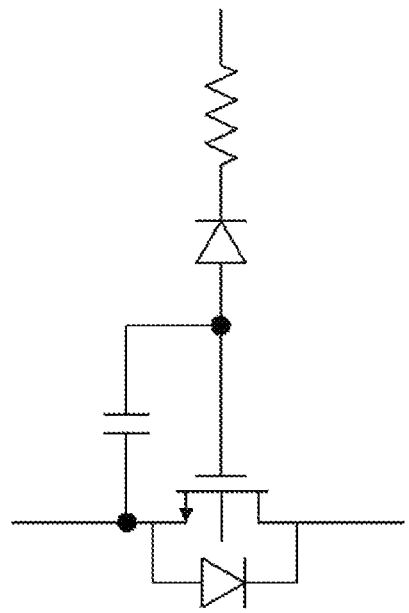

Referring to FIGS. 4, 5A, and 5B, the first switch module and the second switch module may include reverse bias diodes 331 and 341, TVS diodes 332 and 342, protection resistors 333 and 343, switch elements 334 and 344, and capacitors 335 and 345, respectively.

When the switch module is an off state, each of the reverse bias diodes 331 and 341 blocks a current in the opposite direction. For example, if input to the first input stage is normal and input to the second input stage is an off state, the state of the second switch module 340 becomes an off state. However, since the state of the first switch module is an on state, there is a possibility that a current in the opposite direction from the overvoltage protection circuit or the control module may become a reverse bias to the first input stage. Accordingly, a more stable lamp can be implemented through the reverse bias diodes by properly locating elements, such as the reverse bias diodes 331 and 341.

The TVS diodes 332 and 342 operate in response to a predetermined voltage or more. In this case, the TVS diode may operate when a voltage applied thereto is 54 V or higher. Such a TVS diode is an electronic part designed to protect an electronic device which is sensitive in a high voltage transient, and may respond to an overvoltage more rapidly. Furthermore, the TVS diode has a greater cross section than a normal diode and operates by limiting a voltage in a specific level. In general, the TVS diode is associated with electrostatic discharge or a data line, and may be used to prevent a light strike and severe pressure induced by inductive load switching.

Furthermore, the TVS diode is used to protect a circuit from an electrical excessive state generated in electrostatic discharge or inductive load switching or inductive discharge. In TVS, the size of a voltage which damages a circuit is reduced when the voltage is introduced to the extent that the circuit is not damaged. Furthermore, when an excessive phenomenon is generated, TVS immediately clamps a voltage based on a clamping voltage.

The protection resistors 333 and 343 are connected in series to the TVS diodes 332 and 342, and prevent damage to the TVS diodes. When power is inputted to the first input stage or the second input stage, a momentary spike current may flow. The protection resistor can protect the TVS diode.

Figure 6:
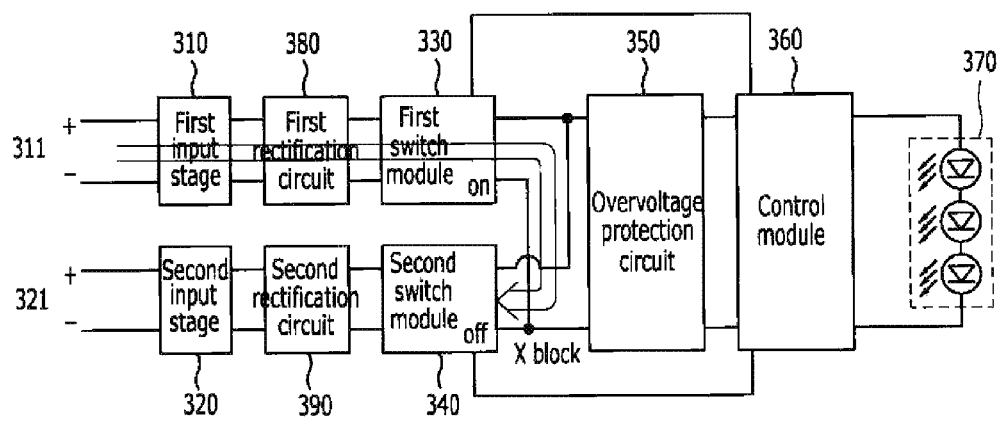
FIG. 6 is an exemplary diagram showing an operating method for blocking the ballast stabilizer-compatible lamp including a leakage current protection circuit according to an embodiment of the present invention in an overvoltage state.

Each of the switch elements 334 and 344 may switch on/off depending on a predetermined condition. In this case, the switch element switches on/off in response to the size of a voltage applied thereto. Reference is made to FIG. 6 for a detailed description of the operation of the switch element.

Furthermore, the switch element is a thyristor (SCR) or an FET, and may be implemented using all of semiconductor devices which may be used as electrical switch elements.

Referring to FIG. 5A, the ballast stabilizer-compatible lamp including a leakage current protection circuit according to an embodiment of the present invention may be implemented using a thyristor (SCR). The thyristor SRC is a 4-layer semiconductor device and is also called a silicon-controlled rectifier. Such a thyristor is one type of a rectifier. In the thyristor, a gate current from the gate of the thyristor flows into the cathode of the thyristor and thus conducts between the anode and the cathode. When a constant current passes through the gate, the thyristor has a property that the anode and the cathode conduct (i.e., switch on). When a current between the anode and the cathode becomes a specific value or less, the anode and the cathode stop (i.e., switch off). Accordingly, the thyristor may operate as a contactless on/off switch.

In such a thyristor, control of a high voltage and high current is easy, a control gain is high, and an on state can be maintained although a gate signal becomes extinct. Furthermore, the thyristor has advantages in that it has high reliability because lifespan is semi-permanent, it is strong against a surge voltage and current, and it can be installed very easily on a device or unit due to a small size and light weight.

Furthermore, in the case of FIG. 5A, the first switch module or second switch module of the ballast stabilizer-compatible lamp may include a thyristor and a plurality of resistors. If the first switch module or second switch module is formed of a plurality of resistors, input power from the first input stage is used for only a voltage distribution or a current distribution depending on a resistance value. As in an embodiment of the present invention, however, if the switch module is configured using a resistor and a diode connected in series and a capacitor, the switch module directly operates at a specific voltage or more even without a separate voltage distribution. Furthermore, there are advantages in that the diode can be effectively protected and the noise of a signal can be removed.

Referring to FIG. 5B, the ballast stabilizer-compatible lamp including a leakage current protection circuit according to an embodiment of the present invention may be implemented using a Field Effect Transistor (FET). The FET has very high input impedance and is driven in response to a voltage. A current flowing between the drain and source of the FET is greatly changed in response to a voltage applied to the gate. Accordingly, the FET may also be used as an on/off switch because the on/off state of the FET may be greatly changed in response to a voltage applied to the gate.

The capacitors 335 and 345 may perform noise filtering. The capacitor may be located so as to remove noise included in power received from the first input power or the second input power. An R-C filter having a capacitor and a resistor connection in parallel may be used.

The overvoltage protection circuit 350 is electrically connected to the first switch module 330 and the second switch module 340, and prevents an overvoltage. In this case, the overvoltage protection circuit 350 may also function as a ballast stabilizer-compatible circuit. The reason for this is that an overvoltage may be applied if different ballast stabilizers are connected because the type of ballast stabilizer is various and thus each ballast stabilizer may have different performance. Accordingly, the overvoltage protection circuit 350 functions to prevent an overvoltage and to protect a circuit.

Furthermore, the output stage of the first switch module 330 and the output stage of the second switch module 340 are electrically connected. Accordingly, the first switch module and the second switch module separately operate in respective input terminals, such as the first input stage 310 and the second input stage 320, and are then electrically connected in the overvoltage protection circuit 350. Accordingly, the single control module 360 may control the input stages and the switch modules on both sides.

The control module 360 is electrically connected to the overvoltage protection circuit 350, and senses and controls the state of the first switch module 330, the second switch module 340, and the overvoltage protection circuit 350.

The light source 370 is electrically connected to the control module 360, and radiates light when power is applied thereto. In this case, the light source is an LED.

The ballast stabilizer-compatible lamp including a leakage current protection circuit according to an embodiment of the present invention may further include a first rectification circuit 380 or a second rectification circuit 390. The first rectification circuit 380 rectifies the first external power received from the first input stage 310 and applies the rectified power to the first switch module 330. The second rectification circuit 390 rectifies the second external power received from the second input stage 320 and applies the rectified power to the second switch module 340. In this case, the first rectification circuit or the second rectification circuit is a bridge diode.

Furthermore, the ballast stabilizer-compatible lamp including a leakage current protection circuit according to an embodiment of the present invention is a tube type lamp having the first input stage 310 at one end and the second input stage 320 at the other end. Furthermore, the first input stage 310 further includes a first input electrode for receiving the first external power 311, and the second input stage further includes a second input electrode for receiving the second external power 321.

FIG. 6 is an exemplary diagram showing an operating method for blocking the ballast stabilizer-compatible lamp including a leakage current protection circuit according to an embodiment of the present invention in an overvoltage state.

In the ballast stabilizer-compatible lamp including a leakage current protection circuit according to an embodiment of the present invention, when the first external power is normally received and the second external power is an off state, the first switch module is an on state and the second switch module is an off state. Furthermore, when the first external power is an off state and the second external power is normally received, the first switch module is an off state and the second switch module is an on state.

In this case, the state in which the first external power or the second external power is normally received refers to the state in which the first external power or the second external power comes into contact with the ballast stabilizer and is received. The state in which the first external power or the second external power is the off state refers to the state in which it has not been received in the state in which it does not come into contact with the ballast stabilizer.

Referring to FIG. 6, in an embodiment of the present invention, the first input stage is the state in which it has been connected to the first external power and the second input stage is an off state in which it has not been connected to the second external power. When the first external power is applied, it flows through the first rectification circuit, and thus the first switch module becomes an on state. However, the second switch module maintains an off state because the external power is not applied, and the second switch module is blocked so that the leakage current does not flow to a user located on the second input stage 320. Likewise, the second input stage is the state in which it has been connected to the second external power. Although a user touches the first input stage, the first switch module is blocked because it switches to an off state.

An embodiment of the present invention provides the ballast stabilizer-compatible lamp including an electronic switch in order to prevent a momentary electric shock. Accordingly, a consumer can be protected from an accident, such as a fall and a lighting failure.

Furthermore, if a conventional mechanical type switch is used, a mold and assembly failure may occur, and thus a separate cost for replacing a mold may be wasted. However, the ballast stabilizer-compatible lamp including a leakage current protection circuit according to an embodiment of the present invention does not have a problem, such as a separate mold failure because the electronic switch is used.

Furthermore, the ballast stabilizer-compatible lamp including a leakage current protection circuit according to an embodiment of the present invention can be disposed in an area including great humidity (e.g., outdoors) because it is capable of waterproofing processing. Accordingly, the degree of freedom of the installation of a service company can be improved.

Furthermore, in the ballast stabilizer-compatible lamp including a leakage current protection circuit according to an embodiment of the present invention, the switch modules are installed on both sides of a tube type lamp. Accordingly, a danger of an electric shock can be effectively prevented because the switch module enters an off state although any stage is touched.

The aforementioned embodiments of the present invention have been disclosed for illustrative purposes, and the present invention is not restricted by the embodiments. Furthermore, those skilled in the art to which the present invention pertains may modify and change the present invention in various ways within the spirit and scope of the present invention, and such modifications and changes should be construed as belonging to the scope of the present invention.

What is claimed is:

1. A ballast stabilizer-compatible lamp comprising a leakage current protection circuit, the ballast stabilizer-compatible lamp comprising:
    a first input stage configured to receive first external power;
    a second input stage configured to receive second external power;
    a first switch module electrically connected to the first input stage and configured to switch on/off depending on a predetermined condition;
    a second switch module electrically connected to the second input stage and configured to switch on/off depending on a predetermined condition;
    an overvoltage protection circuit electrically connected to the first switch module and the second switch module and configured to prevent an overvoltage;
    a control module electrically connected to the overvoltage protection circuit and configured to sense the state of the first switch module, the second switch module and the overvoltage protection circuit, and to control the first switch module, the second switch module and the overvoltage protection circuit; and a light source electrically connected to the control module and configured to radiate light when power is applied, wherein the first switch module or the second switch module comprises:

a reverse bias diode configured to block a current in an opposite direction if the switch module is an off state;

a TVS (transient voltage suppression) diode configured to operate when a predetermined voltage or more is applied;

a protection resistor configured to prevent damage to the TVS diode;

a switch element configured to switch on/off depending on a predetermined condition; and a capacitor configured to perform noise filtering.

2. The ballast stabilizer-compatible lamp of claim 1, wherein commercial power is converted into the predetermined first external power and second external power in a ballast stabilizer and inputted to the first input stage or the second input stage.

3. The ballast stabilizer-compatible lamp of claim 1, further comprising:

a first rectification circuit configured to rectify the first external power received from the first input stage and apply the rectified power to the first switch module; and a second rectification circuit configured to rectify the second external power received from the second input stage and apply the rectified power to the second switch module.

4. The ballast stabilizer-compatible lamp of claim 3, wherein the first rectification circuit or the second rectification circuit is a bridge diode.

5. The ballast stabilizer-compatible lamp of claim 1, wherein the switch element comprises a thyristor (SCR) or an FET.

6. The ballast stabilizer-compatible lamp of claim 1, wherein the switch element switches on/off in response to a size of a voltage applied to the switch element.

7. The ballast stabilizer-compatible lamp of claim 1, wherein the TVS diode operates when a voltage applied to the TVS diode is 54 V or higher.

8. The ballast stabilizer-compatible lamp of claim 1, wherein an output stage of the first switch module and an output stage of the second switch module are electrically connected.

9. The ballast stabilizer-compatible lamp of claim 1, wherein if the first external power is normally received and the second external power is an off state, the first switch module is an on state and the second switch module is an off state.

10. The ballast stabilizer-compatible lamp of claim 1, wherein if the first external power is an off state and the second external power is normally received, the first switch module is an off state and the second switch module is an on state.

11. The ballast stabilizer-compatible lamp of claim 1, wherein the light source comprises an LED.

12. The ballast stabilizer-compatible lamp of claim 1, wherein the ballast stabilizer-compatible lamp is a tube type lamp.

13. The ballast stabilizer-compatible lamp of claim 1, wherein:

the first input stage further comprises a first input electrode for receiving the first external power, and the second input stage further comprises a second input electrode for receiving the second external power.

* * * * *